(12) United States Patent
Jackson et al.

(10) Patent No.: US 7,084,193 B2
(45) Date of Patent: Aug. 1, 2006

(54) PROCESS FOR THE PREPARATION OF A SUSPENSION OF SILICA IN AN OPTIONALLY CROSSLINKABLE SILICONE MATRIX

(75) Inventors: Scott Jackson, Troy, NY (US); Alain Pouchelon, Meyzieu (FR)

(73) Assignee: Rhodia Chimie, Aubervilliers (FR)

( * ) Notice: Subject to any disclaimer, the term of this patent is extended or adjusted under 35 U.S.C. 154(b) by 274 days.

(21) Appl. No.: 10/433,931

(22) PCT Filed: Nov. 21, 2001

(86) PCT No.: PCT/FR01/03752

§ 371 (c)(1), (2), (4) Date: May 27, 2003

(87) PCT Pub. No.: WO02/44259

PCT Pub. Date: Jun. 6, 2002

(65) Prior Publication Data

US 2004/0044113 A1    Mar. 4, 2004

(30) Foreign Application Priority Data

Nov. 30, 2000    (FR) .................................. 00 15519

(51) Int. Cl.
*C08K 9/06*    (2006.01)
(52) U.S. Cl. .................. 523/213; 523/212; 524/524; 524/588
(58) Field of Classification Search ................ 523/213, 523/212; 524/588
See application file for complete search history.

(56) References Cited

U.S. PATENT DOCUMENTS

| | | | | |
|---|---|---|---|---|
| 4,785,047 A | * | 11/1988 | Jensen | 524/714 |
| 5,009,874 A | * | 4/1991 | Parmentier et al. | 423/335 |
| 5,908,660 A | * | 6/1999 | Griffith et al. | 427/220 |
| 5,985,953 A | * | 11/1999 | Lightsey et al. | 523/212 |
| 6,384,125 B1 | * | 5/2002 | Bergstrom et al. | 524/492 |
| 6,391,944 B1 | * | 5/2002 | Canpont et al. | 523/212 |

FOREIGN PATENT DOCUMENTS

| | | |
|---|---|---|
| GB | 2 287 284 | 9/1995 |
| WO | WO 00/37549 | 6/2000 |
| WO | WO 00/61074 | 10/2000 |

* cited by examiner

Primary Examiner—Margaret G. Moore

(57) ABSTRACT

The invention relates to the preparation of a suspension of precipitated silica in a silicone oil, this suspension being usable for the production of silicones crosslinkable by polyaddition or polycondensation (RTV elastomers). The object of the invention is to seek a compromise between on the one hand the cost and on the other hand the rheology and mechanical properties of the final RTVs. The invention achieves this object by providing a process for the preparation of a suspension of precipitated silica, treated with hexamethyldisilazane (HMDZ), in a crosslinkable silicone oil. This HMDZ is introduced in at least two fractions. The 1st fraction on the one hand corresponds to a proportion less than or equal to 15% by dry weight, based on the total amount of HMDZ, and on the other hand is first brought into contact with the precipitated silica and the water. The invention further relates to the production of a silicone elastomer composition from this suspension and to the composition thus obtained.

7 Claims, No Drawings

PROCESS FOR THE PREPARATION OF A SUSPENSION OF SILICA IN AN OPTIONALLY CROSSLINKABLE SILICONE MATRIX

This application is an application under 35 U.S.C. Section 371 of International Application Number PCT/FR01/03752 filed on Nov. 21, 2001.

The invention relates to the field of filled silicones and particularly silicone elastomers crosslinkable by polyaddition or polycondensation, and antifoaming silicone compositions.

More precisely, the present invention relates to the preparation of an intermediate which can be used for obtaining these elastomers and these antifoaming silicone compositions. This intermediate consists of a suspension of a fine filler (as defined below) in:

a polyorganosiloxane (POS) not carrying reactive groups, or a polyorganosiloxane carrying Si-alkenyl groups, preferably Si-Vi groups, capable of reacting with the crosslinking Si—H groups of another POS by polyaddition, or a polyorganosiloxane carrying Si—OR° groups (preferably Si—OH groups) capable of reacting by hydrolysis/polycondensation.

In the case of silicone elastomers, the fillers in question are reinforcing fillers as distinct from non-reinforcing fillers.

The most commonly used reinforcing fillers are preferably pyrogenic silicas with a BET surface area of >50 $m^2/g$. They owe their reinforcing effect on the one hand to their morphology and on the other hand to the hydrogen bonds which form between the silanol groups on the surface of the silicas and the polyorganosiloxane chains. These interactions between the filler and the polymer increase the viscosity and modify the behaviour of the polymer near the solid surface of the fillers. Furthermore, the bonds between polymer and filler improve the mechanical properties, but can also cause a detrimental premature curing ("structuring") of the precursor compositions of the elastomers.

Non-reinforcing fillers have an extremely weak interaction with the silicone polymer, examples being chalk, powdered quartz, diatomaceous earth, mica, kaolin, aluminas or iron oxides. Their effect is often to increase the viscosity of the non-vulcanized precursors of the elastomers, as well as the Shore hardness and the modulus of elasticity of the latter.

The silicone elastomers can also contain, inter alia, catalysts, inhibitors, crosslinking agents, pigments, antiadhesive agents, plasticizers and adhesion promoters.

These elastomers crosslinkable by polyaddition or polycondensation (also called RTV elastomers) are shaped, before crosslinking, by casting, extrusion, calendering or coating, with a brush or gun, or by compression, injection or transfer moulding.

Silicone compositions crosslinkable in the cold to give elastomers by polyaddition at ambient temperature or higher temperatures (generally <200° C.) are conventionally packaged in the form of two-component systems, i.e. systems comprising two separately packed parts to be mixed at the time of use.

In these two-component systems (RTV II), one of the components comprises the catalyst for the polyaddition reaction. This catalyst is preferably based on platinum. For example, it can be a platinum complex such as that prepared from chloroplatinic acid and 1,3-divinyl-1,1,3,3-tetramethyldisiloxane according to U.S. Pat. No. 3,814,730 (Karstedt catalyst). Other platinum complexes are described in U.S. Pat. Nos. 3,159,601, 3,159,662 and 3,220,972.

This component containing the catalyst generally also comprises a POS of type A with crosslinking groups Fa: Si-alkenyl, preferably Si-vinyl.

The other component, without catalyst, comprises at least one POS of type B with crosslinking groups Fb: Si—H.

In general, the type A POSs and the type B POSs comprise at least two Si-Vi and Si—H groups, respectively, per molecule, preferably in the α,ω-positions in the case of the type A POSs, at least one of the two comprising at least three crosslinking groups per molecule.

These two-component systems can also contain a platinum inhibitor preventing the components from crosslinking until they have been mixed together, optionally after having been heated. The following may be mentioned as examples of inhibitors:

polyorganosiloxanes, advantageously cyclic polyorganosiloxanes, substituted by at least one alkenyl, tetramethylvinyltetrasiloxane being particularly preferred, pyridine, organic phosphines and phosphites, unsaturated amides, alkylated maleates, and acetylenic alcohols (cf. FR-B-1 528 464 and FR-A-2 372 874).

Such compositions can also be presented in the form of one-component systems which only crosslink after they have been heated.

Silicone compositions crosslinkable or curable to give elastomers by poly-condensation at ambient temperature or higher temperatures (generally <100° C.) are conventionally packaged in the form of one-component systems (i.e. systems comprising a single pack) or two-component systems (i.e. systems comprising two separately packed parts to be mixed at the time of use).

In the two-component systems, one of the components comprises in particular a POS of type C with reactive end groups Fc, especially hydroxy-dimethylsiloxy end groups, the other component containing the catalyst for the polycondensation reaction. This catalyst can be a metal compound, for example an organic tin compound. This component containing the catalyst can also comprise a crosslinking agent D carrying groups Fd capable of reacting with the reactive groups Fc of the POS C.

Such compositions can also be presented in the form of one-component systems which crosslink at ambient temperature in the presence of moisture.

In the case of antifoaming compositions based on unreactive silicones, the fillers used are particulate fillers of the type referred to above for the elastomeric compositions. These fillers act through their non-deformable character, their geometry and their dimensions and also by way of the interactions which they undergo with the surrounding medium.

The preparation of the concentrated suspensions (pastes) of reinforcing particulate fillers in reactive or unreactive silicone oils for the production of crosslinkable elastomers or antifoaming silicone compositions is a step of the processes for the manufacture of elastomeric compositions which is widely used in the field of silicone elastomers.

The best-known reinforcing particulate fillers are based on pyrogenic silica, but it is also possible in certain cases to use substances such as precipitated silica and titanium oxide, for example.

These fillers have a BET specific surface area of at least 50 $m^2/g$ to generally 400 $m^2/g$. They are ultrafine powders which can be dispersed in silicone oils. This dispersion presents problems when mixing the pulverulent filler with the oil, and particular care must be taken to ensure that a uniform distribution of the filler in the suspension is obtained.

Another difficulty to be overcome concerns the rheology of the suspensions prepared. In fact, it is clear that the introduction of a pulverulent particulate filler of very small particle size into the silicone oil necessarily induces an appreciable increase in viscosity. Now, although associated with obtaining good mechanical properties for the silicone elastomers comprising the suspension as starting material, this characteristic detracts from the handling and shaping of the suspension and the silicone compositions containing it. In fact, for moulding, extrusion, coating or shaping, it is more convenient to handle fluid compositions which can easily be pumped, flow or be mixed with functional additives, inter alia.

As far as antifoams are concerned, fluid compositions are generally sought; the use of a production intermediate consisting of a concentrated suspension according to the invention, described below, is one way of achieving this objective.

These problems concerning the handling of reinforcing fillers and the very high viscosity of the pastes containing them create a third major disadvantage of an economic nature, associated with the complexity of the equipment to be used.

The problem considered here can therefore be summarized as the search for a novel process for the preparation of suspensions of fine particulate fillers in silicone oils which:
produces homogeneous suspensions having a fine distribution of the particles in the silicone matrix,
enables the rheology of the suspension to be adapted to the handling constraints (processability),
makes it possible ultimately to obtain crosslinked elastomers with satisfactory mechanical properties,
and is economic.

French patent application 2 320 324 describes a process for the homogeneous distribution, in polyorganosiloxanes, of a filler based on pyrogenic silica which is highly dispersed and has a BET specific surface area of at least 50 $m^2/g$. This process is characterized in that the filler is treated with a compatibilizing agent (hexamethyldisilazane) during incorporation, in the presence of water. In the process described in said patent application of the prior art, an $\alpha,\omega$-trimethylsiloxy-polydimethylsiloxane is mixed with hexamethyldisilazane (HMDZ) and water. Once this mixture has been homogenized, particulate pyrogenic silica is incorporated and the ingredients are mixed until a homogeneous mixture is obtained. This is then heated at 130° C. to remove the excess HMDZ and water by devolatilization. The mixture is left to cool and the viscosity of the resulting suspension is found to be relatively high, which of course favours good mechanical properties for the elastomers capable of being prepared from this suspension, but proves prohibitive from the point of view of handling in an industrial context. This treatment for compatibilizing the silica with the silicone oil can be described as "early" since the HMDZ is present as soon as the reinforcing pyrogenic silica is brought into contact with this silicone oil.

The exclusive use of powdered pyrogenic silica places a heavy economic burden on this known process.

Processes for the preparation of a suspension of reinforcing pyrogenic silica in silicone oils are also known in which the compatibilizing treatment with hexamethyldisilazane is carried out after incorporation of the silica into the silicone oil. This method of treatment is described here as "late". It produces relatively fluid suspensions. In some cases, the suspensions formed can have a certain tendency to exhibit thixotropy. This is not without having undesirable consequences when these suspensions are transformed and handled, especially as regards the removal of bubbles therefrom. Whatever the case may be, it has been found that, irrespective of the theological properties of the suspensions obtained by late treatment with HMDZ, the final mechanical properties of the elastomers prepared from said suspensions are capable of improvement (hardness, breaking stress, elongation at break, tear strength), and that the compromise obtained is different from that found in the case of early treatment.

As an illustration of this type of compatibilizing treatment, there may be mentioned European patent application 0 462 032; this describes a process for the preparation of a paste which can be used especially in compositions crosslinkable by a polyaddition reaction, thereby affording silicone elastomers. In this process, the following are injected continuously and simultaneously into a twin-screw extruder at four or more different points:
at least one Si-Vi POS oil,
water,
powdered pyrogenic silica,
and a polysilazane which is liquid under normal temperature and pressure conditions (HMDZ).

The powdered pyrogenic silica is injected downstream of the oil and the water and upstream of the HMDZ, but without any mixing taking place, on the one hand between the HMDZ and the water and on the other hand between the HMDZ and the silica, before the HMDZ is introduced.

Here again, the difficulties associated with the use of pyrogenic silica are still very much present.

U.S. Pat. No. 4,785,047 discloses a mixed compatibilizing treatment situated at the boundary between the early and late treatments referred to above. Said patent relates more precisely to a process for the preparation of transparent silicone elastomers. Said document describes pumpable liquid compositions formed of suspensions of a filler based on pyrogenic silica, treated with HMDZ, in silicone oils which may or may not carry crosslinking groups.

The problem expounded in said patent is different from that of the prior art presented above. Rather, the problem in this case is actually to obtain transparent elastomers and, for this purpose, to attempt to counteract the adverse effect of the silica filler on the transparency by means of a very thorough treatment with HMDZ.

In the process forming the subject of said patent, the first step is to mix part of the silicone oil with all the water and the powdered pyrogenic silica, but only with a fraction of the HMDZ, said fraction systematically representing more than 15% by dry weight, based on the silica, namely 34% and 26% in the Examples. After homogenization of this first mixture, the remaining HMDZ is incorporated and mixed therewith. The next step is to carry out a devolatilization treatment for 1 hour at 150° C. under reduced pressure. The final step is to mix in the remainder of the PDMS and $\alpha,\omega$-di-Vi PDMS silicone oil for 1 hour at ambient temperature. The transparent crosslinkable silicone suspension obtained has a viscosity of between 200 and 10,000 Pa.s at 25° C.

This technical proposition may possibly provide a solution to the problem of transparency, but proves unsatisfactory as regards the viscosity and handling of the suspension; in particular, it remains very expensive due to the use of powdered pyrogenic silica.

Also, PCT patent applications WO-98/58997 and WO-00/37549 disclose processes for the preparation of pastes containing silicone oils capable of reacting by polyaddition and polycondensation, respectively, in which a first fraction of HMDZ (less than 8% of the total) is introduced before the silicone oil and the powdered pyrogenic silica are brought into contact, the remainder of the HMDZ being introduced afterwards. Although such a technical proposition appears to be satisfactory from the point of view of the homogeneity of the suspension and the mechanical properties of the crosslinked elastomers obtained, it is clear that it is wholly capable of improvement from the point of view of the "processability" and also from the economic standpoint.

In Example 3, page 9, European patent application EP-0 669 376 discloses a process for the preparation of a liquid silicone composition comprising the following in parts by weight:

| | |
|---|---|
| an α,ω-dimethylvinylpolydimethylsiloxane | 400 |
| an α,ω-trimethylsilylpolydimethylsiloxane | 50 |
| FK 160 precipitated silica with a specific surface area of 160 m²/g, marketed by DEGUSSA CORP | 250 |
| a compatibilizing agent, namely HMDZ | 50 |
| and water | 25 |

In a first step, the two silicone oils and the silica are mixed together.

In a second step, the HMDZ and the water are added to the mixer, the mixing continuing for one hour.

In a third step, the ingredients are heated to 150° C. and this reactive mixing is allowed to continue for two hours.

In a fourth step, the mixture is cooled to a temperature of 10–30° C.

It should be noted that the crosslinked elastomer obtained by bringing the above-described composition into contact with a POS of the Si—H type has poor mechanical properties and specifically an elongation of 260%.

Moreover, the pasty composition before crosslinking has a high viscosity of 270 Pa·s, which is likely to complicate industrial-scale manufacture.

In such a technical context, one of the essential objects of the present invention is to provide an economic process for the preparation of a suspension of a particulate filler, treated with a compatibilizing agent, in a silicone oil, this suspension being usable as starting material for the manufacture of two-component or one-component compositions crosslinkable especially by polyaddition or polycondensation to give RTV or LSR (liquid silicone rubber) elastomers or antifoaming silicone compositions.

This process must satisfy the following specifications:
the distribution of the filler in the silicone oil has to be uniform and homogeneous,
the dispersion has to be optimized,
the suspension has to flow well (without a flow threshold) and the viscosity has to be appropriate for the handling and transformation of the suspension,
the mechanical properties of the resulting elastomers have to reach an acceptable level or the antifoaming properties have to be of high quality,
and the cost has to be reduced.

Another essential object of the invention is to provide a process for the preparation of a reinforcing filler/silicone oil suspension for RTV elastomers which is simple to carry out and applicable on the industrial scale.

Another essential object of the invention is to provide a process for obtaining a silicone composition crosslinkable by polyaddition or polycondensation to form an RTV elastomer and comprising, as the constituent component, the suspension as obtained by the process referred to above.

Another essential object of the invention is to provide a process for obtaining an antifoaming silicone composition comprising, as the constituent component, the suspension as obtained by the process referred to above.

These and other objects are achieved by the present invention, which relates to a process for the preparation of an aqueous suspension of a particulate silica filler in a silicone material (SM) comprising:

at least one type A polyorganosiloxane (POS) carrying alkenyl crosslinking groups Fa capable of reacting with the crosslinking groups Fb (SiH) of at least one type B POS, said POS A being taken on its own or mixed with at least one unreactive POS (E);

and/or at least one type C POS carrying hydroxyl crosslinking groups Fc and/or groups OR($R=C_1$—$C_{20}$ alkyl) as precursors of the groups Fc, these crosslinking groups Fc being capable of reacting with other crosslinking groups Fc of this POS C or other POS Cs and with crosslinking groups of at least one crosslinking agent D, said POS C being taken on its own or mixed with at least one unreactive POS (E);

or at least one unreactive POS (E), this suspension being usable especially for the production of compositions crosslinkable by polyaddition and/or polycondensation or antifoaming silicone compositions.

This process is of the kind in which:
the particulate filler is treated with at least one compatibilizing agent (CA) added to the preparation medium (preferably) in at least two separate fractions (CA.I) and (CA.II) which are quantitatively and/or qualitatively identical to or different from one another;
the mixing of all or part of the SM, filler, water and CA or CAs is optionally effected partially under the action of heat;
and the by-products and other volatile species are removed, characterized in that:
 a. the particulate filler is selected from the group comprising precipitated silicas,
 b. the amount of water is chosen so that the weight ratio r=water/water+silica is defined as follows:
  60<r<90
  preferably 70<r<85
 c. CA.I is also chosen so that:
  CA.I≦CA
  preferably CA.I≦0.50×CA
  (the value of the lower limit of CA.I relative to CA depending on the nature of the CA or CAs used, this value being equal e.g. to 0.1×CA in the case where CA=HMDZ),
 d. CA.I is brought into contact with all or part of the filler formed of precipitated silica or a mixture of precipitated silicas, and with water,
 e. all or part of the SM is added with the filler resulting from step d),
 f. optionally at least part of the water and the by-products of the reaction of CA.I with SM and with the filler is drawn off,
 g. CA.II and any remaining SM are incorporated,
 h. the whole is left to react, preferably with agitation and optionally under the action of heat, so that CA reacts with the silica filler, i. optionally at least part of the remaining water released and the by-products of the reaction of CA.I with SM and with the filler is drawn off, j. optionally the volatile species are removed, preferably under the action of heat in a stream of gas or under vacuum, k. and the product is cooled if necessary.

It is to the inventors' credit, after numerous researches and experiments, to have selected the well-delimited group of precipitated silicas as the particulate filler and the high water contents used (cf. ratio r). It has thus been possible to discover, totally surprisingly and unexpectedly, this novel process for the manufacture of silica suspensions which:

results in a significant cost reduction;

is easier to carry out;

enables by-products of the compatibilizing treatment (especially aqueous ammonia) to be removed more completely;

affords suspensions possessing appropriate rheological properties and visco-elastic behaviour (low flow threshold, if any); in particular, said suspensions have a stable fluidity over time which is suitable for the handling and transformation operations such as pumping, conveying, mixing, shaping, moulding, extrusion, etc.;

and also favours the processing of (removal of bubbles from) the RTV elastomer compositions prepared from these suspensions.

In terms of the invention, the option attached to step j) is interpreted as follows:

for an elastomeric silicone composition, step j) is obligatory;

for an antifoaming silicone composition, it is optionally possible to dispense with removal of the volatile species, including water, with a view to subsequent emulsification.

One of the major values of the invention is that this economic gain is not at the expense of the other advantages of the process or the final mechanical properties of the crosslinked elastomer or, as the case may be, the antifoaming properties.

Conventionally, the precipitated silica results from a series of operations which can be e.g. as follows:

precipitation of the silica in the aqueous phase by acidification, either by the addition of acid to a sediment of silicate or by the simultaneous total or partial addition of acid and silicate to a sediment of water or silicate solution, filtration to recover a phase enriched in silica, optionally disintegration of the filtrate of precipitated silica to prepare an aqueous suspension which is easy to handle, optionally drying of the precipitated silica, optionally grinding and/or compaction of the powdered precipitated silica, and optionally bagging of the powdered precipitated silica thus obtained.

For further details on the preparation of precipitated silica, reference may be made for example to the documents EP-A-0 520 862, WO-A-95/09127 and WO-A-95/09128.

Thus the precipitated silica used in the process according to the invention can take the form of a powder or the form of an aqueous slurry removed at the filtration or disintegration stage.

In terms of the invention, the word "powder" employed to describe the precipitated silica denotes precipitated silica in the solid state, generally in pulverulent form or in the form of substantially spherical granules or beads.

According to a preferred characteristic of the invention, the chosen precipitated silica(s) has (have) a BET specific surface area of between 50 and 400 m²/g and the chosen mixing conditions are such that the dynamic viscosity of the suspension (paste) at 25° C. is less than or equal to 300 Pa·s, preferably less than or equal to 150 Pa·s. The BET specific surface area is determined by the BRUNAUER, EMMET, TELLER method described in "The Journal of the American Chemical Society, vol. 80, page 309 (1938)", corresponding to standard NFT 45007 of November 1987.

Advantageously, the precipitated silica filler represents from 10 to 50% by weight of the suspension. In practice, this filler is in the order of 30±10%.

According to a first mode of carrying out the invention, the process according to the invention consists essentially in using a powdered precipitated silica and performing the following operations:

the appropriate products are introduced into the agitated preparative enclosure in the following order:

the water and the powdered precipitated silica(s), advantageously in several fractions, CA.I (step c)), the SM, the ingredients are mixed (step e)), optionally step f) (drawing-off) is carried out, CA.II is added: step g), steps h), j) and optionally i) are carried out.

In variants, step e can be of variable duration or carried out in different equipment.

In another variant, the introduction of at least CA.I and SM can be simultaneous.

It is also possible to envisage using only part of the SM in the initial mixture (water/silica/CA.I/SM), the remainder of the SM being incorporated at a later stage.

In this first mode of carrying out the invention with powdered precipitated silica, the proportions of the different constituents of the paste are preferably as follows (in parts by dry weight, except for the water):

SM oil: 100, water: 15 to 1000, preferably from 58 to 380,

CA. I: 0.2 to 20, preferably from 0.7 to 15,

CA. II: 0 to 20, preferably from 1 to 10, silica: 10 to 100, preferably from 25 to 67.

According to a second mode of carrying out the invention, the process according to the invention consists essentially in using a slurry of precipitated silica(s) and performing the following operations:

first of all, the slurry of precipitated silica(s) is introduced into the preparative enclosure, CA.I is incorporated into the preparative enclosure: step c), the SM is then introduced into the preparative enclosure, the ingredients are mixed: step e), optionally step f) (drawing-off) is carried out, CA.II is added: step g), steps h), j) and optionally i) are carried out.

This novel preparative process is found to be particularly economic and allows easy incorporation with low-power equipment; in fact, as in the first mode, the composition remains readily malleable throughout the process without requiring enormous mixing power. Furthermore, in the case of crosslinkable silicone elastomers, the use properties of the elastomers ultimately produced by this process are entirely consistent with the expected specifications, compared with the conventional processes using pyrogenic silica. The same applies to the pastes for preparing antifoaming compositions.

Moreover, in the case where the compatibilizing treatment CA involves compatibilizing agents (HMDZ) which generate aqueous ammonia, the use of large amounts of water introduced via the slurry of precipitated silica enables the ammonia to be removed much more easily, said removal of course being effected by steam distillation. This is wholly beneficial because it is known that the retention of nitrogen residues in the elastomeric composition interferes with its keeping properties.

The second mode of carrying out the invention, with the introduction of a preprepared aqueous slurry of precipitated silica, is preferred. In fact, it avoids the step of preparing the slurry in the preparative enclosure.

Furthermore, it is clear that a slurry is much easier to handle than large volumes of powder; in the latter case, it is also necessary to drive the corresponding air out of the mixture during production.

Within the framework of the second mode of carrying out the invention, the constituents of the paste are as follows (in parts by dry weight, except for the water):
SM oil: 100,
water: introduced via the silica slurry in amounts dictated by its dryness,
CA.I: 0.2 to 20, preferably from 0.7 to 15,
CA.II: 0 to 20, preferably from 1 to 10,
silica: 10 to 100, preferably from 25 to 67.

The dryness of the silica slurry is generally between 5 and 50% by weight, preferably between 10 and 40% by weight.

In variants of this preferred second mode of carrying out the invention, the different steps of the process can be of variable duration and carried out in separate equipment.

Whatever the form of the precipitated silica, i.e. powder or slurry, it is particularly interesting to observe that removal of the bubbles from the RTV elastomer compositions prepared with the paste is much easier than previously.

Preferably, the compatibilizing agent CA is selected from silazanes, taken on their own or mixed with one another, and preferably from disilazanes; hexamethyldisilazane (HMDZ), on its own or associated with divinyltetramethyldisilazane, is particularly preferred. It is a liquid product under normal temperature and pressure conditions (23° C.–760 mmHg).

Advantageously, only part (fraction CA.I) of the compatibilizing agent is introduced in a first stage, said fraction preferably being equal to at most 50% of the total amount of CA; in the case of HMDZ, for example, this fraction CA.I ranges from 10 to 50% of the total amount of CA.

It may also be pointed out that the total amount of compatibilizing agent CA is preferably between 2 and 40% of the silica filler, preferably between 5 and 30%.

In practice, the proportions of agent CA introduced in a second stage (fraction CA.II) are greater than 35% of CA, preferably greater than 65% of CA.

Advantageously, CA.I and CA. II are of the same type.

According to a noteworthy provision of the invention, corresponding to the case where the filler is precipitated silica and the agent CA is HMDZ, the amount of HMDZ used is sufficient for the proportion of $Si(Me)_3$ units on the silica surface to be $\geq 0.5$ $Si(Me)_3$ unit per $nm^2$, preferably between 1 and 2 $Si(Me)_3$ units per $nm^2$.

According to a third mode of carrying out the invention, the process to which it relates is characterized in that:
the first fraction of CA (CA.I) is wholly or partly replaced with at least one processing auxiliary selected from molecules and associations of molecules which are capable of:
    interacting with the particulate filler, particularly with the silanols SiOH in the case where a silica filler is involved, at the expense of the hydrogen bonds which this particulate filler maintains especially between its own atoms and/or with those of the silicone oil,
    and being removed from the preparative medium by drawing-off or devolatilization without an adverse effect on the formulation of the finished product;
and this processing auxiliary is chosen to be compatible with the presence of water in the preparative medium.

According to this third mode of carrying out the invention, the processing auxiliary is preferably compatible with the final formulation or can easily be removed from the preparative medium.

Advantageously, the processing auxiliary is selected from the group of compounds which can adsorb onto silica and modify its surface character, said group comprising:
difunctional or monofunctional siloxanes with hydroxyl end groups and a low molecular weight (advantageously below 1000 g/mol);
amines, for example alkylamines (such as diethylamine) and/or silylamines;
surfactants and more particularly cationic surfactants.

As indicated above, the products more particularly selected as processing auxiliaries are those with a low molecular weight. This is true especially of the amines and siloxane compounds mentioned above.

As regards the silicone oils used in the process according to the invention, linear or cyclic polydiorganosiloxanes, especially linear polydiorganosiloxanes, will preferably be chosen.

Thus the silicone material can primarily be a polyaddition SM containing:
at least one reactive silicone oil POS A whose crosslinking groups Fa are alkenyl groups, preferably vinyl groups, these POS As:
    comprising at least two Si-Fa groups per molecule, preferably with one located at each end of the chain,
    and having a dynamic viscosity less than or equal to 250 Pa·s, preferably of 100 Pa·s and particularly preferably of 10 Pa·s, at 25° C.,
    this POS A being intended to react with at least one reactive silicone oil POS B whose crosslinking groups Fb are hydrogen groups, this POS B comprising at least two Si—H groups per molecule (preferably at least three when the POS A comprises only two Si-Vi groups per molecule), these Si—H groups advantageously being located in the chain,
and/or at least one unreactive POS E.

The POS A will be e.g. an α,ω-divinylpolydialkyl(methyl)siloxane. Preferably, the POS A used to prepare the suspension is a vinylic POS A carrying at least two Si-Vi units per molecule, preferably at least three per molecule, when the POS B contains only two Si—H units per molecule.

The POS B is e.g. a polyalkyl(methyl)hydrogenosiloxane or alternatively a branched hydrogenated POS containing trifunctional or tetrafunctional units and units carrying SiH.

The POS E can be a polydiorganosiloxane such as a polyalkylsiloxane and preferably a polydimethylsiloxane with trimethylsilyl end groups.

The preferred silicone oils (A, B, E) essentially comprise $R^1_2SiO$ units, the symbols $R^1$, which are identical or different, representing optionally halogenated $C_1$—$C_4$ (cyclo)alkyl groups or optionally substituted or halogenated aryl groups.

The following groups may be mentioned:
alkyl: especially methyl, ethyl, propyl and butyl groups,
halogenoalkyl: 3,3-trifluoropropyl,
cycloalkyl: cyclohexyl,
aryl: the phenyl group.

Preferably, at least 85% of the groups $R^1$ are methyl groups.

Secondly, the silicone material can be a polycondensation SM containing:

at least one reactive silicone oil POS C whose crosslinking groups Fc react by polycondensation, these POS Cs having formula (1) below:

 (1)

in which:
R represents identical or different monovalent hydrocarbon radicals and Y represents identical or different hydrolyzable or condensable groups or a hydroxyl group, n is selected from 1, 2 and 3, n being 1 when Y is a hydroxyl, and x has a sufficient value to give the oils of formula (1) a dynamic viscosity of between 1000 and 200,000 mPa·s at 25° C., this POS C being intended to react with another POS C or with at least one crosslinking agent D, and/or at least one unreactive POS E different from the POS C(s).

In the products of formula (1) generally used in industry, at least 80% by number of the radicals R are methyl radicals; the other radicals can generally be phenyl radicals.

Examples of hydrolyzable groups Y which may be mentioned are amino, acylamino, aminoxy, ketiminoxy, iminoxy, enoxy, alkoxy, alkoxyalkylenoxy, acyloxy and phosphato groups, examples of these being as follows:

for amino groups Y: n-butylamino, sec-butylamino and cyclohexylamino groups, for N-substituted acylamino groups: the benzoylamino group, for aminoxy groups: dimethylaminoxy, diethylaminoxy, dioctylaminoxy and diphenylaminoxy groups, for iminoxy and ketiminoxy groups: those derived from acetophenone oxime, acetone oxime, benzophenone oxime, methyl ethyl ketoxime, diisopropyl ketoxime and chlorocyclohexanone oxime, for alkoxy groups Y: groups having from 1 to 8 carbon atoms, such as methoxy, propoxy, isopropoxy, butoxy, hexyloxy and octyloxy groups, for alkoxyalkylenoxy groups Y: the methoxyethylenoxy group, for acyloxy groups Y: groups having from 1 to 8 carbon atoms, such as formyloxy, acetoxy, propionyloxy and 2-ethylhexanoyloxy groups, for phosphato groups Y: those derived from dimethyl phosphate, diethyl phosphate and dibutyl phosphate groups.

Condensable groups Y which may be mentioned are hydrogen atoms and halogen atoms, preferably chlorine.

The reactive POS Cs which are preferably used are the α,ω-dihydroxy-diorganopolysiloxanes of formula (1) in which Y=OH, n=1 and x has a sufficient value to give the polymers a dynamic viscosity of between 1000 and 200,000 mPa·s, preferably of between 5000 and 80,000 mPa·s, at 25° C.

It must be understood that, within the framework of the present invention, hydroxylated POS Cs of formula (1) used can be a mixture consisting of several hydroxylated polymers which differ from one another by the viscosity value and/or the nature of the substituents bonded to the silicon atoms. It must also be pointed out that the hydroxylated polymers of formula (1) can optionally comprise, in addition to the units D of the formula $R_2SiO$, units T of the formula $RSiO_{3/2}$ and/or units Q of the formula $SiO_2$ in a proportion of at most 1% (these percentages expressing the number of units T and/or Q per 100 silicon atoms).

This polycondensation SM can also comprise an unreactive silicone oil containing unreactive POS Es of formula (2) below:

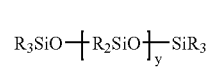 (2)

in which:
the substituents R, which are identical or different, represent monovalent hydrocarbon radicals, and the symbol y has a sufficient value to give the polymers a dynamic viscosity of between 10 and 10,000 mPa·s at 25° C.

Examples of radicals R which may be mentioned are alkyl radicals having from 1 to 8 carbon atoms, such as methyl, ethyl, propyl, butyl, hexyl and octyl, and phenyl radicals.

Examples of substituted radicals R which may be mentioned are 3,3,3-trifluoropropyl, chlorophenyl and beta-cyanoethyl radicals.

The units of the following formulae may be mentioned as an illustration of units represented by the formula $R_2SiO$: $(CH_3)_2SiO$; $CH_3(C_6H_5)SiO$; $(C_6H_5)_2SiO$; $CF_3CH_2CH_2(CH_3)SiO$; $NC-CH_2CH_2(CH_3)SiO$.

It must also be pointed out that the hydroxylated polymers of formula (2) can optionally comprise, in addition to the units D of the formula $R_2SiO$, units T of the formula $RSiO_{3/2}$ and/or $SiO_2$ units in a proportion of at most 1% (these percentages expressing the number of units T and/or Q per 100 silicon atoms).

The crosslinking agents D intended for reacting with the POS Cs of the polycondensation SM carry hydroxyl crosslinking groups Fd and/or groups OR ($R=C_1-C_{20}$ alkyl) as precursors of the groups Fd, said crosslinking groups being capable of reacting with other groups Fc of the POS C and/or Fd of the crosslinking agent D. The latter is preferably selected from:

the silanes of the general formula

 (3)

in which:
the substituents R, which are identical or different, have the same general or particular meanings as those given above in formula (1), and the symbols Y', which are identical or different, represent the same hydrolyzable or condensable groups as those mentioned above in respect of the groups Y of formula (1), and the partial hydrolysis products of a silane of formula (3), said crosslinking agent D being obligatory when the reactive POS C(s) is (are) α,ω-dihydroxylated POSs and optional (but desirable) when the reactive POS C(s) carries (carry) condensable groups (other than OH) or hydrolyzable groups at each end of the chain.

As other examples of crosslinking agents D selected from monomeric silanes, there may be mentioned more particularly polyacyloxysilanes, polyalkoxysilanes, polyketiminoxysilanes and polyiminoxysilanes, particularly the following silanes:

CH$_3$Si(OCOCH$_3$)$_3$; C$_2$H$_5$Si(OCOCH$_3$)$_3$; (CH$_2$=CH)Si(OCOCH$_3$)$_3$;
C$_6$H$_5$Si(OCOCH$_3$)$_3$; CF$_3$CH$_2$CH$_2$Si(OCOCH$_3$)$_3$;
NC—CH$_2$CH$_2$Si(OCOCH $_3$)$_3$;
CH$_2$ClSi(OCOCH$_2$CH$_3$)$_3$; CH$_3$Si[ON=C(CH$_3$)C$_2$H$_5$]$_2$(OCH$_2$CH$_2$OCH $_3$);
CH$_3$Si[ON=CH(CH$_3$)$_2$]$_2$(OCH$_2$CH$_2$OCH$_3$); Si(OC$_2$H$_5$)$_4$; Si(O-n-C$_3$H$_7$)$_4$;
Si(O-iso-C$_3$H$_7$)$_4$; Si(OC$_2$H$_4$OCH$_3$)$_4$; CH$_3$Si(OCH$_3$)$_3$; CH$_2$=CHSi (OCH$_3$)$_3$;
CH$_3$Si(OC$_2$H$_4$OCH$_3$)$_3$; ClCH$_2$Si(OC$_2$H$_5$)$_3$; CH$_2$=CHSi(OC$_2$H$_4$OCH$_3$)$_3$.

The partial hydrolysis products, for example polyalkoxysilanes, conventionally called polyalkyl silicates, are well-known products. The product most commonly used is polyethyl silicate 40®, which is derived from the partial hydrolysis of Si(OC$_2$H$_5$)$_4$.

The crosslinking agents D preferably used in the case of the preferred use of α,ω-dihydroxylated POSs of formula (1) are the alkyltrialkoxysilanes and tetraalkoxysilanes of formula (3), in which R is an alkyl radical having from 1 to 4 carbon atoms, and the partial hydrolysis products of these preferred silanes.

The intended purpose of the reinforcing filler/silicone oil suspension prepared according to the invention is to be used for obtaining liquid or pasty silicone compositions crosslinkable by polyaddition or polycondensation, preferably to give an RTV silicone elastomer in the ambient atmosphere at normal temperature or at a more elevated temperature, or for obtaining unreactive liquid or pasty silicone compositions (antifoams).

Thus, according to another of its features, the present invention relates to a process for obtaining a silicone composition crosslinkable by polyaddition, characterized in that it consists in mixing, apart from formulating additives not listed, the following products in particular:

α—a suspension prepared by the process as defined above;
β—optionally one or more POS As as defined above;
δ—one or more POS Bs as defined above;
γ—optionally one or more unreactive POS Es as defined above, useful as diluents,
-ϵ—a catalyst system comprising a catalyst preferably based on platinum, and optionally an inhibitor.

In a first variant of this process:
the composition is produced in the form of systems with two components P$_1$ and P$_2$, which are intended to be brought into contact with one another to produce an elastomer crosslinked by polyaddition between the POS As and Bs,
and said parts are chosen such that only one of them, P$_1$ or P$_2$, contains the catalyst ϵ, the other containing the POS B.

In a second variant of this process for the preparation of crosslinkable liquid compositions, a one-component system is produced which is intended to crosslink in the ambient air and/or under the effect of temperature.

These compositions crosslinkable by polyaddition to give elastomers can also comprise one or more functional additives η, for example a non-reinforcing filler formed of chalk, powdered quartz, diatomaceous earth, mica, kaolin, aluminas or iron oxides. These optional additives η can also consist of pigments, antiadhesive agents, plasticizers, rheology modifiers, stabilizers or adhesion promoters.

The invention further relates to a process for obtaining a silicone composition crosslinkable by polycondensation, characterized in that it consists in mixing the following products:
α'—suspension prepared by the process as defined above;
β'—optionally one or more POS Cs as defined above;
δ'—one or more crosslinking agents D;
γ'—optionally one or more POS Es as defined above, useful as diluents;
ϵ'—a catalyst system comprising a condensation catalyst;
ν'—optionally one or more semi-reinforcing, non-reinforcing or bulking fillers;
ρ'—optionally water;
κ'—optionally one or more additives selected from pigments, plasticizers, other rheology modifiers, stabilizers and/or adhesion promoters.

As far as the fillers ν' are concerned, they generally have a particle diameter greater than 0.1 μm and are preferably selected from ground quartz, zirconates, calcined clays, diatomaceous earths, calcium carbonate and aluminas.

In a first variant of the process for obtaining a silicone composition crosslinkable or curable by polycondensation to give an elastomer, a one-component composition (i.e. a composition in a single pack) is produced which is intended to crosslink in the presence of moisture, particularly moisture introduced via the ambient air or via the water present in and/or added to the composition, at ambient temperature and/or under the effect of temperature ranging e.g. from 25° C. to a value below 100° C. In this case, the crosslinking catalyst ϵ' used is a metal catalyst selected especially from tin monocarboxylates, diorganotin dicarboxylates, a tin(IV) chelate, a hexacoordinate tin(IV) chelate, aminosilanes, an organic titanium derivative and an organic zirconium derivative.

In a second variant of the process for the preparation of compositions crosslinkable to give elastomers:
each composition is produced in the form of a system with two components (or two packs) P$_1$ and P$_2$, which are intended to be brought into contact with one another to give a polycondensation RTV elastomer,
and said parts are chosen such that only one of them, P$^1$ or P$_2$, contains the catalyst ϵ' and optionally the crosslinking agent(s) D, except for the POS C.

In the case of the two-component compositions, the polycondensation catalyst ϵ' used is preferably an organic tin derivative as defined above, an amine, a mixture of these species or an organic titanium derivative.

The mixtures involved in these processes can be produced by means of appropriate known devices, for example the conventional mixers normally used for these preparations:
blade mixers
kneaders
planetary mixers
ploughshare paddle mixers
co-rotating or counter-rotating double-shaft mixers
continuous-flow extrusion mixers or other batch or continuous-flow devices:
agitated reactors
static mixers The mixing operation takes place at normal temperature and pressure, preferably under an inert atmosphere (N$_2$). Moreover, under these conditions, the silicone oil, the water and also the compatibilizing agent should be in liquid form to facilitate mixing.

The Examples which follow illustrate:
the preparation of the suspensions of reinforcing filler in a silicone material, according to the invention,
the application of these suspensions as starting material for obtaining two-component compositions crosslinkable to give polyaddition RTV II silicone elastomers, and the evaluation of the viscoelastic properties of the suspensions and the mechanical properties of the elastomers crosslinked by polyaddition, obtained from said suspensions.

EXAMPLES

I—Preparation of the Pastes

Comparative Example 1

Composition by Weight

| 70.9% | α,ω-divinylic oil of viscosity 1.5 Pa · s |
| 0.47% | water |
| 0.42% | hexamethyldisilazane (CA.I) |
| 24.6% | pyrohydrolysis silica with a surface area of 200 m²/g, marketed by DEGUSSA under the name AEROSIL ® 200 |
| 3.56% | hexamethyldisilazane (CA.II) |

Process

The ingredients are added cold in the order indicated; in particular, the silica is incorporated in small portions because of its highly pulverulent character.

They are mixed for 1 hour in the cold before the second portion of HMDZ is added; after a further 1 hour of mixing in the cold, the temperature is raised to 130° C., at which the mixer is evacuated; the resulting devolatilization is continued for 2 hours before the mixer is cooled.

Example 2

Test with Precipitated Silica

Composition by Weight

| 70.8% | α,ω-divinylic oil of viscosity 1.5 Pa · s |
| 0.47% | water |
| 0.42% | hexamethyldisilazane (CA.I) |
| 24.6% | precipitated silica with a surface area of about 160 m²/g, marketed by RHODIA under the name Zéosil ® 1165 |
| 3.58% | hexamethyldisilazane (CA.II) |

CA.I/CA.II = 0.117; CA.I = 10.5% of CA

Process

This is identical to that of Comparative Example 1.

Example 3

Test with Slurry of Precipitated Silica

Composition by Weight

| 69.0% | α,ω-divinylic oil of viscosity 1.5 Pa · s |
| 63.0% | water |
| 3.47% | hexamethyldisilazane (CA.I) |
| 24.0% | precipitated silica with a surface area of about 160 m²/g, marketed by RHODIA SILICES under the name Silice Zéosil ® 1165MD |
| 3.47% | hexamethyldisilazane (CA.II) |

CA.I/CA.II = 1, CA.I = 50% of CA

Process

The water and the silica are first brought together in a laboratory blade mixer of capacity 1.5 liters. The first portion of HMDZ is introduced before the oil is added. After homogenization for 1 hour, the second portion of HMDZ is added and the procedure continues in conventional manner with the thermal mixing and devolatilization phases, the latter being slightly prolonged in order to thoroughly remove the water from the composition.

II—Preparation of the Elastomers

The pastes are used to formulate elastomers which crosslink by an addition reaction. For this purpose, the following are added to the pastes to be tested:
additional α,ω-divinylic silicone oil of viscosity 1.5 Pa·s
an α,ω-dihydrogeno silicone oil carrying Si—H groups in its chain, containing 20% by weight of Si—H groups and having a viscosity of 25 mPa·s
a Karstedt platinum catalyst
ethynylcyclohexanol to regulate the addition reaction The molar ratio of Si—H groups to Si-Vi groups is about 1.4. The amount of catalyst is such that platinum is present in the mixture in a proportion of 20 ppm. The amount of reaction regulator is gauged so as to adjust the gelling time of the mixture to between 1 and 2 hours at ambient temperature.

The mixture prepared is crosslinked at ambient temperature; the resulting properties are measured after 24 hours under these conditions.

Comparative Properties of the Suspensions and Vulcanized Elastomers of Examples 1 to 3

The viscosity of the suspensions is measured by means of a cone and plate viscometer. The complex viscosity and the ratio of the elastic and viscous components G'/G" at a frequency of 1 Hz under a stress of 1 Pa are taken as representative of the viscoelastic behaviour of the suspensions.

The mechanical properties are measured according to the current standards:
DIN 53505 for the hardness measurement,
AFNOR T46002 for the breaking stress measurements.

| EXAMPLE | | 1 | 2 | 3 |
|---|---|---|---|---|
| Paste | | | | |
| Viscosity | Pa · s | 98 | 56 | 116 |
| Elasticity | G'/G" | 0.90 | 0.67 | 0.63 |
| Residual ammonia | ppm | 50 | 80 | 20 |
| Elastomer | | | | |
| Hardness | Shore A | 30 | 30 | 28 |
| Breaking stress | MPa | 7.3 | 5.4 | 4.7 |
| Elongation | % | 635 | 730 | 755 |
| Tear strength | N/mm | 32 | 25 | 21.5 |

Comments

With the silica slurry, there is no need to handle large volumes of powder or hence to evacuate all the corresponding air when it is incorporated into the silicone. This incorporation phase is appreciably shortened as a result.

In economic terms, the use of precipitated silica and the omission of several steps in the manufacture of this precipitated silica has a positive impact on the cost of the final elastomer.

If the preparative operations are monitored, it is clearly apparent that, where the manufacture of a conventional paste proceeds via a phase which demands enormous mixing power, this is not the case with the silica slurry (Example 3), the composition remaining readily malleable throughout the process.

The use of a large quantity of water in this novel process favours the removal of the aqueous ammonia arising as a by-product of the treatment with HMDZ (steam distillation); furthermore, it is known that the retention of nitrogen residues in the paste interferes with its keeping properties.

The ease with which bubbles are removed from the elastomers comprising the precipitated silica according to the invention is much improved; this is a very important property for the processing of these products.

Finally, equivalent properties are obtained whether the silica is used in powder or slurry form; these properties are at a good level in respect of the active surface area of the silica used.

The invention claimed is:

1. A process for the preparation of a suspension of a particulate silica filler in a silicone material (SM) comprising:
    at least one type A polyorganosiloxane (POS) carrying alkenyl crosslinking groups Fa capable of reacting with the crosslinking groups Fb (SiH) of at least one type B POS, said POS A being taken on its own or mixed with at least one unreactive POS (E);
    and/or at least one type C POS carrying hydroxyl crosslinking groups Fc and/or groups OR ($R=C_1-C_{20}$ alkyl) as precursors of the groups Fc, these crosslinking groups Fc being capable of reacting with other crosslinking groups Fc of this POS C or other POS Cs and with crosslinking groups of at least one crosslinking agent D, said POS C being taken on its own or mixed with at least one unreactive POS (E);
    or at least one unreactive POS (E),
this suspension being usable for the production of compositions crosslinkable by polyaddition and/or polycondensation or antifoaming silicone compositions, said process comprising the steps of:
a) treating and contacting all or part of the particulate filler which is a precipitated silica with at least one fraction (CA.I) of a compatibilizing agent (CA) added to a preparation medium in at least two separate fractions (CA.I) and (CA.II) which are quantitatively identical to or different from one another, water being present in a percentage weight ratio r=water/(water+silica): 60% <r<90%,
b) adding all or part of the SM with the filler resulting from step a),
c) optionally, drawing off at least part of the water and the by-products of the reaction of CA.I with SM,
d) incorporating CA.II and any remaining SM,
e) leaving the whole obtained in step d) to react, optionally under the action of heat, so that CA reacts with the silica filler, to give a product, and
f) recovering the product obtained in step e).

2. The process according to claim 1, wherein:
70%<r<85%, and
the quantity of CA.I is as follows:

CA.I≦0.50×CA.

3. The process according to claim 1, wherein the precipitated silica(s) has (have) a BET specific surface area of between 50 and 400 m²/g and the mixing conditions are such as to obtain a dynamic viscosity of the suspension at 25° C. of less than or equal to 300 Pa·s.

4. The process according to claim 3, wherein the dynamic viscosity, is less than or equal to 150 Pa·s.

5. The process according to claim 1, comprising the use of a slurry of precipitated silica(s) in step a).

6. The process according to claim 1, wherein the compatibilizing agent (CA) is selected from silazanes, disilazanes, hexamethyl-disilazane (HMDZ) or hexamethyldisilazane associated with divinyltetramethyldisilazane.

7. The process according to claim 1, wherein a polycondensation SM is used which contains:
    at least one reactive silicone oil POS C whose crosslinking groups Fc react by polycondensation, these POS Cs having formula (1) below:

$$Y_nR_{3-n}SiO\text{-}[R_2SiO]_xSiR_{3-n}Y_n \qquad (1)$$

wherein:
    R represents identical or different monovalent hydrocarbon radicals and Y represents identical or different hydrolyzable or condensable groups or a hydroxyl group,
    n is selected from 1, 2 and 3, n being 1 when Y is a hydroxyl, and x has a sufficient value to give the oils of formula (1) a dynamic viscosity of between 1000 and 200,000 mPa·s at 25° C.,
    this POS C being intended to react with another POS C or with at least one crosslinking agent D, and/or at least one unreactive POS E different from the POS C(s).

* * * * *